(12) United States Patent
Giles et al.

(10) Patent No.: US 8,077,628 B2
(45) Date of Patent: Dec. 13, 2011

(54) MOBILE DEVICE PEER VOLUME POLLING

(75) Inventors: Jarrad Andrew Giles, Raleigh, NC (US); Justin Monroe Pierce, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 12/029,991

(22) Filed: Feb. 12, 2008

(65) Prior Publication Data

US 2009/0203370 A1 Aug. 13, 2009

(51) Int. Cl.
*H04W 4/00* (2009.01)
*H04W 24/00* (2009.01)
*H04L 12/26* (2006.01)
*H04B 17/00* (2006.01)
*H04M 3/00* (2006.01)

(52) U.S. Cl. ....... 370/252; 370/338; 455/67.7; 455/418; 455/456.6

(58) Field of Classification Search .................. 370/252, 370/338; 455/67.7, 418, 456.6
See application file for complete search history.

(56) References Cited

U.S. PATENT DOCUMENTS

| 6,603,397 | B2 * | 8/2003 | Bronson | 340/540 |
| 6,650,894 | B1 | 11/2003 | Berstis et al. | |
| 7,050,796 | B2 | 5/2006 | Humphrey et al. | |
| 7,069,027 | B2 | 6/2006 | Miriyala | |
| 7,079,852 | B1 * | 7/2006 | Budnik | 455/456.5 |
| 7,110,558 | B1 * | 9/2006 | Elliott | 381/105 |
| 7,283,548 | B2 * | 10/2007 | Denninghoff | 370/412 |
| 7,720,435 | B2 * | 5/2010 | Bettinger | 455/3.02 |
| 2004/0137929 | A1 * | 7/2004 | Jones et al. | 455/517 |
| 2006/0035649 | A1 | 2/2006 | Vargas | |
| 2006/0099967 | A1 | 5/2006 | Colvin et al. | |
| 2007/0117595 | A1 | 5/2007 | Sherman | |

OTHER PUBLICATIONS

Levijoki, "Privacy vs Location Awareness", 2000, pp. 1-15, Tik-110. 501 Seminar on Network Security.

* cited by examiner

*Primary Examiner* — Alpus H Hsu
(74) *Attorney, Agent, or Firm* — Yee & Associates, P.C.; Thomas E. Tyson (57) ABSTRACT

Performing local peer volume polling by a mobile device is provided. In response to determining that a polling function is enabled in a mobile device, a request is transmitted to each of the peer mobile devices using the polling function. The polling function requests audible operation level setting data from peer mobile devices within a predetermined distance of the mobile device. A map is computed of the peer mobile devices, along with their associated audible operation level settings, based on responses to the request for the audible operation level setting data. The map and audible operation level settings for the peer mobile devices are analyzed using rules to detect an inappropriate volume setting for the mobile device. In response to determining that a current audible operation level setting for the mobile device is inappropriate using the rules, a new audible operation level setting is applied to the mobile device.

20 Claims, 5 Drawing Sheets

MOBILE DEVICE PEER VOLUME POLLING

BACKGROUND OF THE INVENTION

1. Field of the Invention

Embodiments of the present invention relate generally to an improved mobile electronic device. More specifically, embodiments of the present invention are directed to a computer implemented method, system, and computer usable program code for automatically adjusting an audible operation level of a mobile electronic device using peer volume polling.

2. Description of the Related Art

Today, mobile electronic devices, such as cellular telephones, pagers, and personal digital assistants, are becoming increasingly pervasive in our society. The widespread use of these mobile electronic devices has adversely affected group events attended by individuals who use such devices. When individuals carrying these mobile devices enter certain locations, such as movies, theaters, concert halls, restaurants, meeting rooms, hospitals, churches, and other similar public venues, common courtesy, as well as numerous restrictions, dictate that these wireless mobile devices either be muted or turned off.

However, users of these wireless mobile devices may forget to mute or turn off these devices upon entering such locations. This may result in distracting other individuals at the location when a mobile device unexpectedly "goes off" and may cause embarrassment to the particular individual carrying the device. In general, this problem persists not because people refuse to respect others, but rather because people simply forget to switch their mobile devices to a non-intrusive or silent mode of operation.

Most attempts at preventing these wireless mobile devices from interrupting group events are of the "low tech" variety. Perhaps the first and simplest attempt at preventing noise interruptions from mobile devices is the use of signs posted outside of meeting areas. Other attempts at preventing interruptions include inserting reminders to mute or turn off mobile devices at the beginning of movies or other types of audio-visual presentations. These types of attempts have provided a small degree of success, but as the number of wireless mobile device users continues to grow, noise interruptions from forgetful users will also increase.

SUMMARY

Illustrative embodiments provide a computer implemented method, data processing system, and computer program product for performing local peer volume polling by a mobile device. In response to determining that a polling function is enabled in a mobile device, a request is transmitted to each of the peer mobile devices using the polling function. The polling function requests audible operation level setting data from peer mobile devices within a predetermined distance of the mobile device. A map is computed of the peer mobile devices, along with their associated audible operation level settings, based on responses to the request for the audible operation level setting data. The map and audible operation level settings for the peer mobile devices are analyzed using rules to detect an inappropriate volume setting for the mobile device. In response to determining that a current audible operation level setting for the mobile device is inappropriate using the rules, a new audible operation level setting is applied to the mobile device.

BRIEF DESCRIPTION OF THE SEVERAL VIEWS OF THE DRAWINGS

The novel features believed characteristic of the invention are set forth in the appended claims. The invention itself, however, as well as a preferred mode of use and advantages thereof, will best be understood by reference to the following detailed description of an illustrative embodiment when read in conjunction with the accompanying drawings, wherein:

DETAILED DESCRIPTION OF THE INVENTION

Figure 1:
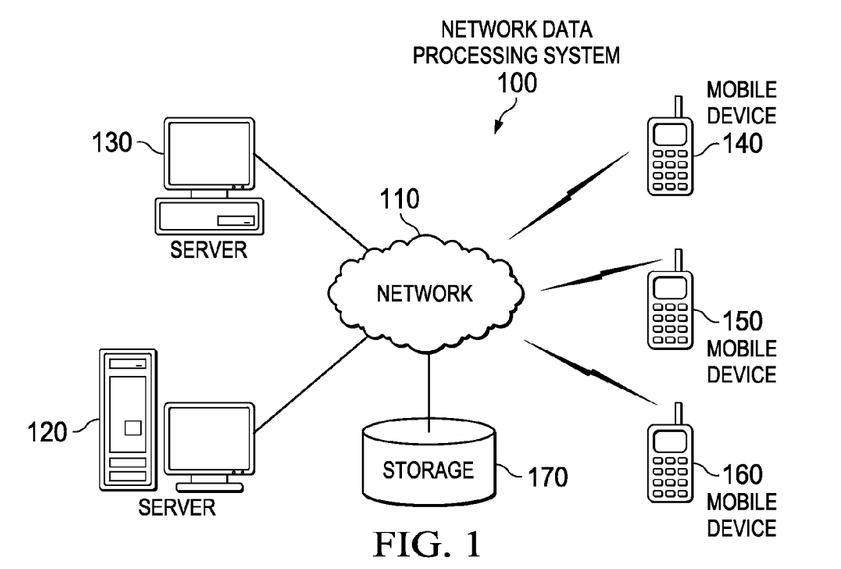
FIG. 1 is a pictorial representation of a network of data processing systems in which illustrative embodiments may be implemented.
Figure 2:
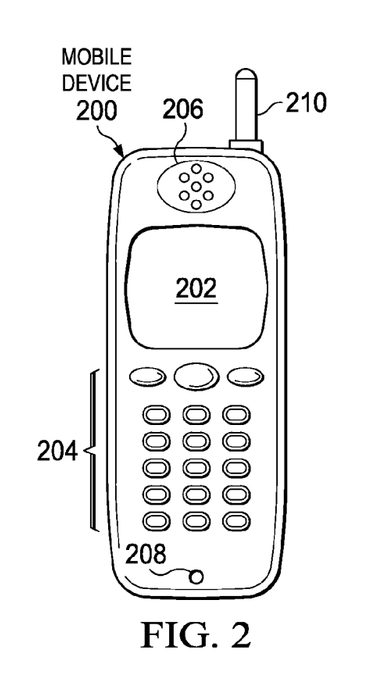
FIG. 2 is a pictorial representation of a mobile device in which illustrative embodiments may be implemented.
Figure 3:
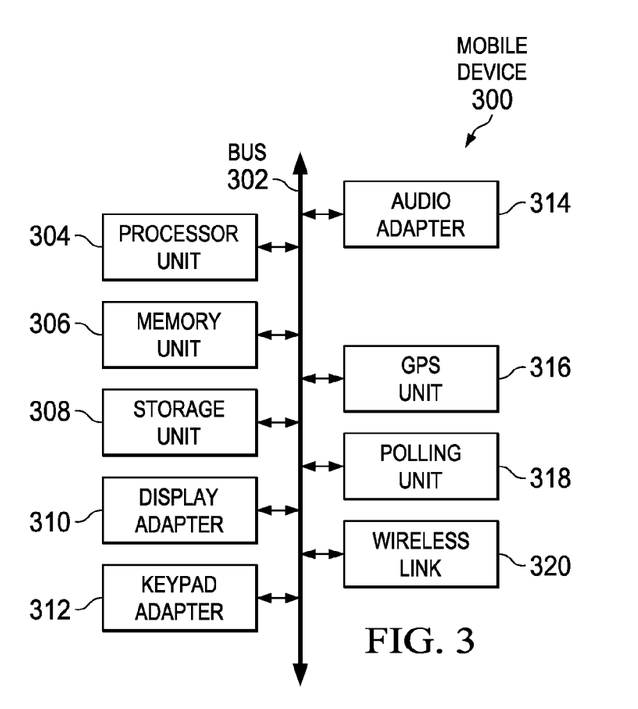
FIG. 3 is an exemplary block diagram of mobile device components in accordance with an illustrative embodiment.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which illustrative embodiments may be implemented. Network data processing system 100 contains network 110, which is the medium used to provide communication links between the various computers and other devices coupled together within network data processing system 100. Network 110 may include several types of connections, such as wire, wireless communication links, or fiber optic cables. However, for this illustrative embodiment depicted in FIG. 1, wireless communication links are emphasized.

In the depicted example of FIG. 1, server 120 and server 130 are coupled to network 110 by wire or wireless communication links. Servers 120 and 130 may, for example, be communication servers with high speed connections to network 110. Also, servers 120 and 130 may represent a plurality of communication servers located within a local area network (LAN) or a wide area network (WAN). Further, servers 120 and 130 may, for example, reside within a cellular telephone service provider (SP) network. In another illustrative embodiment, servers 120 and 130 may, for example, independently or in combination provide communication services for a plurality of cellular telephone SP networks.

Mobile devices 140, 150, and 160 are coupled to network 110 via wireless means. In addition, mobile devices 140, 150, and 160 are clients to servers 120 and 130. In this illustrative example, mobile devices 140, 150, and 160 are cellular telephones relying on wireless communication links. However, it should be noted that besides being cellular telephones, the mobile devices shown in FIG. 1 may, for example, be personal digital assistants (PDAs), handheld gaming devices, handheld computers, laptop computers, pagers, wristwatches, or any other type of mobile electronic device that includes an audible output and relies on wireless communication links.

Storage unit 170 also is coupled to network 110 and represents any type of storage device that is capable of storing data in a structured and/or unstructured format. Also, storage unit 170 may represent a plurality of storage units coupled to network 110. Storage unit 170 may, for example, be a database for a cellular telephone SP network that contains customer information, such as customer names, addresses, telephone numbers, and personal profile data.

Further, storage unit 170 also may contain location data for a plurality of mobile devices. A mobile device or a service provider may use the location data to, for example, specifically locate the mobile device and other mobile devices within network 110.

Also, network data processing system 100 may include additional servers, clients, and other devices not shown. Moreover, network data processing system 100 may, for example, represent the Internet with network 110 representing a worldwide collection of networks and gateways that use the transmission control protocol/internet protocol (TCP/IP) suite of protocols to communicate with one another. Internet protocol (IP) telephony is the two-way transmission of voice over a packet-switched IP network, which is part of the TCP/IP suite of protocols. The terms "IP telephony" and "voice over IP" (VoIP) are synonymous. VoIP is a telephone service that uses the Internet as a global telephone network. At the heart of the Internet is a backbone of high-speed data communication lines between major nodes or host computers, consisting of thousands of commercial, government, educational, and other computer systems that route data and messages.

It should be appreciated by those of ordinary skill in the art that FIG. 1 is only intended as an exemplary illustration and is not intended as an architectural limitation for illustrative embodiments. Further, it should be appreciated by those of ordinary skill in the art that even though the example of FIG. 1 depicts a cellular telephone network, illustrative embodiments may be utilized by any type of wireless/mobile system.

With reference now to FIG. 2, a pictorial representation of a mobile device is depicted in which illustrative embodiments may be implemented. Mobile device 200 may, for example, be mobile device 140 in FIG. 1. Also, mobile device 200 is a cellular telephone in this illustrative example of FIG. 2. However, illustrative embodiments may utilize any type of wirelessly enabled mobile device, such as a PDA, a handheld computer, a handheld gaming device, or a laptop computer, to accomplish processes of illustrative embodiments.

Mobile device 200 includes display 202 to present textual and graphical information to a user. Display 202 may be a known display device, such as a liquid crystal display (LCD) or an organic light-emitting diode (OLED) display. Mobile device 200 also includes keypad 204, speaker 206, and microphone 208. A user may utilize keypad 204 to enter telephone numbers, user identification information, and commands for interacting with the interface. Mobile device 200 may present audio output via speaker 206. A user may utilize microphone 208 not only for voice communication, but also for entering specific voice commands for voice actuated functions. Further, mobile device 200 uses antenna 210 to establish wireless communication links with a network, such as, for example, network 110 in FIG. 1. However, it should be noted that even though antenna 210 is shown as an external antenna, antenna 210 may represent an internal antenna as well.

With reference now to FIG. 3, an exemplary block diagram of mobile device components is depicted in accordance with an illustrative embodiment. In the illustrative example of FIG. 3, mobile device 300 may, for example, be implemented in mobile device 200 in FIG. 2. However, it should be noted that illustrative embodiments may be implemented in any type of wirelessly enabled mobile device.

In this illustrative example, mobile device 300 utilizes a bus architecture, such as bus 302. Bus 302 may include one or more buses. In addition, bus 302 may be implemented using any type of communication fabric or architecture that provides for a transfer of data between the different components or devices coupled to bus 302.

Mobile device 300 includes processor unit 304, memory unit 306, storage unit 308, display adapter 310, keypad adapter 312, audio adapter 314, global position system (GPS) unit 316, polling unit 318, and wireless link 320, which are coupled to bus 302. However, it should be noted that mobile device 300 is only shown for exemplary purposes and is not meant as an architectural limitation to illustrative embodiments. In other words, mobile device 300 may include more or fewer components as necessary to perform processes of illustrative embodiments.

Processor unit 304 provides the data processing capabilities of mobile device 300. An operating system runs on processor unit 304 and coordinates and provides control of various components within mobile device 300. In addition, software applications executing on mobile device 300 may run in conjunction with the operating system.

Storage unit 308 is a non-volatile storage device that may, for example, be configured as read only memory (ROM) and/or flash ROM to provide the non-volatile memory for storing the operating system, applications, and user-generated data. Storage unit 308 also stores instructions or computer usable program code for the operating system, applications, and illustrative embodiments. The instructions are loaded into memory unit 306 for execution by processor unit 304. Processor unit 304 performs processes of illustrative embodiments by executing the computer usable program code that is loaded into memory unit 306.

However, it should be noted that mobile device 300 may store data in a remote storage device, such as, for example, storage 170 in FIG. 1, in addition to, or instead of, storage unit 308. In addition, storage unit 308 may contain any data necessary for processes of illustrative embodiments to provide an ad hoc wireless network for mobile device 300 to perform peer volume polling. Peer volume polling is when mobile device 300 requests audible operation levels from other peer mobile devices within the immediate vicinity.

A mobile ad hoc wireless network is a network of data processing systems, such as a plurality of mobile devices coupled via wireless links, the union of which forms an arbitrary communication grid. These mobile devices within the ad hoc wireless network are free to randomly move and arbitrarily organize themselves, which is in contrast to the typically envisioned computer network.

In general, a mobile ad hoc network includes a number of geographically-distributed, potentially mobile nodes wirelessly coupled by one or more radio frequency channels. The mobile devices create and form the ad hoc wireless network on the fly as devices transmit packets to, or receive packets from, other mobile devices within the ad hoc wireless network. The ad hoc wireless network does not depend on any one particular mobile device to function and dynamically adjusts as mobile devices join and/or leave the ad hoc wireless network.

Each mobile device within the ad hoc wireless network may send its own messages to other mobile devices within the ad hoc wireless network. In addition, every mobile device within the ad hoc wireless network may communicate with every other device within the ad hoc wireless network. Further, the ad hoc wireless network may operate as an independent network or may be coupled to a larger internet, such as a cellular telephone network.

The ad hoc wireless network is formed when the plurality of mobile devices share data amongst each other. The plurality of mobile devices may share this data on a predetermined time interval basis, such as, for example, every 30 seconds, 1 minute, 5 minutes, 10 minutes, or any other increment of time. Alternatively, the plurality of mobile devices may share this data on a continuous or near continuous basis.

By sharing location data, mobile devices within the ad hoc wireless network may acquire a general knowledge of the proximity of other mobile devices in the immediate vicinity. However, it should be noted that illustrative embodiments may not require mobile devices to share location data in order to perform processes of illustrative embodiments. For example, if a mobile device, such as a cellular telephone, transmits a request for data utilizing, for example, Bluetooth® technology, at a certain power output, that radio frequency (RF) power dissipates within a particular distance. As a result, mobile devices that respond to the request for data are presumably within a desired radius of the requesting mobile device. Consequently, the requesting mobile device may indirectly determine the proximity of the other mobile devices without requesting location data and calculating distance. Similarly, a mobile device may broadcast a request, such as, for example, "All mobile devices within this GPS area, please respond." Thus, responding mobile devices need not directly transmit their location to the broadcasting mobile device.

In addition, each mobile device may send a message requesting the audible operational level of the other mobile devices within a predetermined distance from the sending mobile device (i.e., peer volume polling). The audible operational level may, for example, be a silent mode, a vibrate mode, a ring mode, a play alert tones mode, or any similar setting. The predetermined distance may, for example, be 10 feet, 25 feet, 50 feet, 75 feet, 100 feet, or any other increment of distance. Alternatively, the predetermined distance may be calculated in terms of location, such as, for example, within a particular building or room.

Mobile device 300 may use GPS unit 316 to provide location data. GPS unit 316 is a GPS transceiver unit that is capable of transmitting and receiving GPS data. GPS unit 316 may send the location data to polling unit 318 and/or to a service provider communication server, such as server 120 in FIG. 1. Alternatively, mobile device 300 may receive location data from the service provider communication server. The service provider communication server may, for example, utilize cellular telephone towers to triangulate the position of mobile device 300. Triangulation by the service provider may serve as another means of determining a general knowledge of proximity of other mobile devices without the use of GPS.

Mobile device 300 uses polling unit 318 to directly communicate with the other mobile devices within the ad hoc wireless network and to perform necessary calculation for processes of illustrative embodiments. Polling unit 318 sends the audible operation data for mobile device 300 to requesting mobile devices within the ad hoc wireless network. Alternatively, polling unit 318 may broadcast the audible operation data to all the other mobile devices within the predetermined distance on a predetermined time interval basis or on-demand by a user of mobile device 300. Further, polling unit 318 may also request or broadcast location data. Furthermore, polling unit 318 sends a message to all other mobile devices within the predetermined distance requesting their audible operation level data. In addition, polling unit 318 receives the location and audible operation data from the other mobile devices.

After receiving the audible operation data, and possibly location data, from the other mobile devices within the predetermined distance, polling unit 318 stores this data within one or more tables in storage unit 308. Polling unit 318 uses the data contained within these tables to calculate how many peer mobile devices out of the total number of peer mobile devices within the predetermined distance of mobile device 300 have a current audible operational level that is different from the current audible operational level of mobile device 300. If a majority of peer mobile devices within the predetermined distance have a different audible operational level, then polling unit 318 sets the current audible operational level of mobile device 300 to a matching audible operational level. A matching audible operational level is a level that matches the audible operational level of the majority of other mobile devices within the predetermined distance.

For example, if the majority of mobile devices within the predetermined distance are currently set to a silent mode and mobile device 300 is currently set to play tones, then polling unit 318 automatically sets mobile device 300's audible operation level to silent to match the majority of other mobile devices within the immediate vicinity. Alternatively, polling device 318 may instead send a text message, such as "Please set to silent mode", to a display unit, such as display 202 in FIG. 2, and/or vibrate mobile device 300 to notify the user of a suggested change in operational mode. Similarly, if the majority of mobile devices within the predetermined distance are currently set to a ring mode and mobile device 300 is currently set to vibrate, then polling unit 318 sets mobile device 300's audible operation level to ring to match the majority of other mobile devices within the immediate vicinity. This latter scenario may occur when the user is leaving a group event and forgets to return the audible operational level of mobile device 300 back to normal or the previous setting.

However, it should be noted that a matching audible operation level may not be an exact match, but a match for a class of audible operation levels. In other words, polling unit 318 may not compare discrete settings, but compare classes of settings. For example, while a vibrate mode and a silent mode are not exact matches, these modes are not necessarily incompatible. As a result, polling unit 318 may utilize a rule engine to employ rules, such as, for example: if 60% of the other mobile devices are set to silent mode, then assert an audible operation level setting that is less than or equal to vibrate mode; and if 90% of the other mobile devices are set to silent mode, then assert an audible operation level setting that is equal to silent mode.

Also, if the other mobile devices that caused a change in the audible operation level setting of the mobile device are no longer present, then the absence of these other mobile devices may also trigger another volume setting change in the mobile device or trigger a notification to the user. For example, when the user leaves a movie theater and is driving home, the other mobile devices that informed the user's mobile device to change to silent mode are no longer around. In fact, no other mobile devices may be in the immediate vicinity and, therefore, no majority is present. This clear change in environment may also trigger polling unit 318's rule engine to apply another rule, such as, for example, if a majority caused a change in the audible operation level setting of the mobile device and that same majority no longer exists, then assert an audible operation level setting that is greater than or equal to the previous volume setting.

In addition, it should be noted that a majority may not be established by a trivial number of other mobile devices within the predetermined distance. For example, the rule engine may employ a rule that requires at least 5 other mobile devices to be involved in the majority decision. Otherwise, if the user of the mobile device walks by a solitary individual on the street with a compatible mobile device, then 100% of the peer mobile devices (i.e., 1) have a majority volume setting. Consequently, the rule engine discards this type of information based on this rule because this type of information is of limited value.

Further, it should be noted that a user of mobile device 300 may enable and disable polling unit 318 independently of other mobile device 300 functions and features. Furthermore, it should be noted that polling unit 318 may be implemented entirely as software, hardware, or as a combination of software and hardware components. Moreover, polling unit 318 may be located remotely within the service provider communication server in addition to, or instead of, within mobile device 300.

Wireless link 320 may, for example, utilize shortwave, high frequency, ultra high frequency, microwave, wireless fidelity (Wi-Fi™), Bluetooth® technology, or any other wireless communication means to establish wireless communication links for mobile device 300. Mobile device 300 also may rely on wireless application protocol (WAP) for facilitating communications. Wireless application protocol is a standard for providing wireless phones, pagers, and other handheld devices with secure access to e-mail and text-based Web pages. Wireless application protocol provides a complete environment for wireless applications that includes a wireless counterpart of TCP/IP and a framework for telephony integration, such as call control and phone book access.

Wireless application protocol features the wireless markup language (WML), which was derived from Phone.com's handheld device markup language (HDML) and is a streamlined version of hypertext markup language (HTML) for small screen displays. Also, wireless application protocol uses WMLScript, a compact JavaScript-like language that runs in limited memory. Additionally, wireless application protocol supports handheld input methods, such as keypad and voice recognition.

Wireless application protocol runs over all the major wireless networks now in place. Also, wireless application protocol is device independent, requiring only a minimum functionality in the unit so that it may be used with a myriad of cellular phones and other mobile electronic devices. However, it should be pointed out that wireless application protocol has been described for illustrative purposes, and other wireless protocols may be used to implement illustrative embodiments.

Those of ordinary skill in the art will appreciate that the components depicted in FIG. 3 may vary depending on implementation of illustrative embodiments. Other internal components or peripheral devices may be used in addition to or in place of the components shown in FIG. 3. For example, mobile communication device 300 also may include a voice recognition system in order to perform functions activated by user voice command.

Thus, illustrative embodiments provide a computer implemented method, system, and computer usable program code for performing peer volume polling. In response to determining that a polling function is enabled in a mobile device, a polling unit transmits a request to peer mobile devices within a predetermined distance of the mobile device using the polling function. The polling function requests audible operation level setting data from the peer mobile devices.

The polling unit computes a generalized map of proximity locations of the peer mobile devices, along with their associated audible operation level settings, based on responses to the request for the audible operation level setting data. In addition, the polling unit analyzes the map and audible operation level settings for the peer mobile devices using rules to detect an inappropriate volume setting for the mobile device. In response to determining that a current audible operation level setting for the mobile device is inappropriate using the rules, the polling unit applies a new audible operation level setting to the mobile device. The new audible operation level setting may, for example, be a matching audible operation level setting that matches a class of audible operation levels for the majority of peer mobile devices within the predetermined distance. The polling unit may automatically apply this matching audible operation level setting as the new audible operation level setting for the mobile device. Alternatively, the polling unit may apply a user selected preference as the new audible operation level setting for the mobile device. This user selected preference may be set by the user after the polling unit notifies the user that the current audible operation level setting may be an inappropriate setting based on rules.

As a result, illustrative embodiments are able to provide an improved mobile device capable of removing the responsibility of silencing a mobile device from the user to a cooperative group of peer mobile devices. Illustrative embodiments enable mobile devices to "poll" other mobile devices within a specified radius for their corresponding volume status. The assumption is that a majority of people using these mobile devices will remember to mute or silence their mobile devices when it is appropriate to do so, such as when entering a movie theater. If a majority of devices in the polling radius are set to a silent mode, then the polling mobile device automatically enters a silent mode or prompts the user to place the mobile device in a silent mode by vibrating the mobile device and displaying a text message.

Illustrative embodiments may be implemented using Bluetooth® technology or some other form of short range wireless communication. Alternatively, a wireless service provider may be used to inform a mobile device of the status of its peer mobile devices within the specified polling radius.

Figure 4:
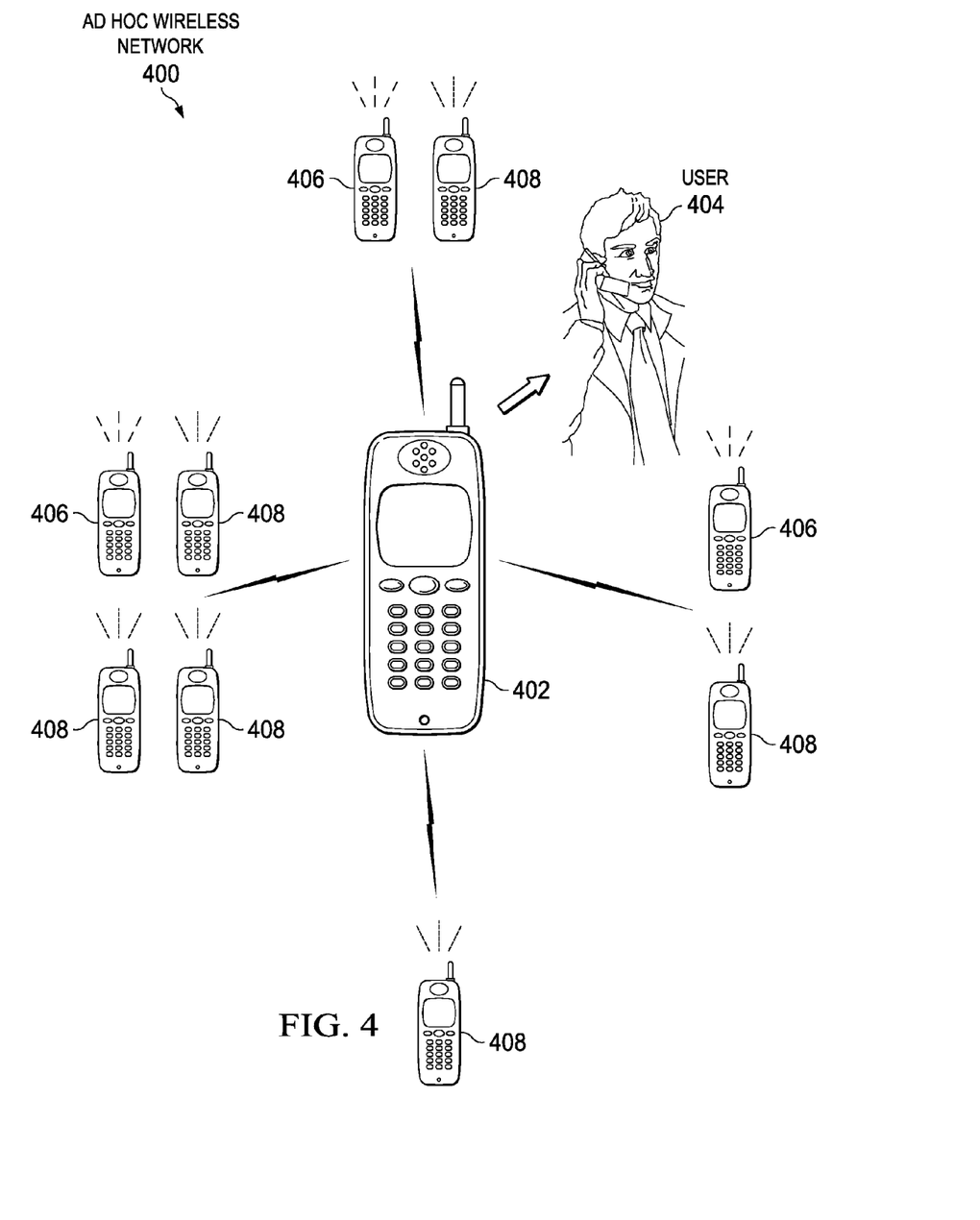
FIG. 4 is an exemplary illustration of an ad hoc wireless network in accordance with an illustrative embodiment.

With reference now to FIG. 4, an exemplary illustration of an ad hoc wireless network is depicted in accordance with an illustrative embodiment. Ad hoc wireless network 400 may, for example, be created in a group event location, such as a restaurant or a movie theater. Ad hoc wireless network 400 includes mobile device 402. Mobile device 402 may, for example, be implemented in mobile device 300 in FIG. 3. User 404 is the owner and/or operator of mobile device 402.

In this exemplary illustration, mobile device 402 is a requesting mobile device. In other words, mobile device 402 is requesting audible operation data directly from the other mobile devices within a predetermined distance, such as, for example, 20 feet. Alternatively, mobile device 402 may request this audible operation data for the other mobile devices within the predetermined distance from a server of a wireless service provider.

Ad hoc wireless network 400 also includes mobile devices 406 and mobile devices 408. Mobile devices 406 and mobile devices 408 are peers of mobile device 402 and are compatible with mobile device 402. Also, mobile devices 406 and 408 are within the predetermined distance of mobile device 402. In addition, as depicted in this exemplary illustration mobile devices 402, 406, and 408 are coupled together to form ad hoc wireless network 400 and may directly communicate with one another to obtain the audible operation data. In an alternative illustrative embodiment, mobile devices 402, 406, and 408 may communicate with one another via the wireless service provider to obtain the audible operation data.

Mobile devices 402, 406, and 408 include a polling unit, such as, for example, polling unit 318 in FIG. 3, to perform processes of illustrative embodiments. Alternatively, instead of the polling unit being located within each mobile device, the polling unit may be located within one or more servers in the wireless service provider network. As a result, the wireless service provider collects and stores the audible operation data from all peer mobile devices within the predetermined distance of the requesting mobile device (i.e., mobile device 402).

The polling device calculates the percentage of mobile devices that have a different audible operation setting from that of the requesting mobile device. If the majority of the mobile devices have a different audible operation level, then the polling device may automatically set the audible operation level of the requesting mobile device to a matching audible operation level or notify the requesting mobile device's user, such as user 404, via a text message suggesting a change in audible operation level.

In this exemplary illustration, mobile devices 402 and 406 have their audio output volume turned on. However, mobile devices 408 have their audio output volume turned off or muted. In other words, out of the 10 total mobile devices within ad hoc wireless network 400, 6 have their audio output volume turned off and 4 have their audio output volume turned on.

Therefore, the polling device calculates that 60%, or the majority, of mobile devices within the predetermined distance of mobile device 402 are in a silent mode. As a result, the polling device automatically adjusts the audible operation level of mobile device 402 to off or silent to match the majority of the other mobile devices within ad hoc wireless network 400. Alternatively, the polling device alerts user 404 by vibrating mobile device 402 and displaying a message in the display suggesting user 404 change the audible operation level to silent mode.

Figure 5:
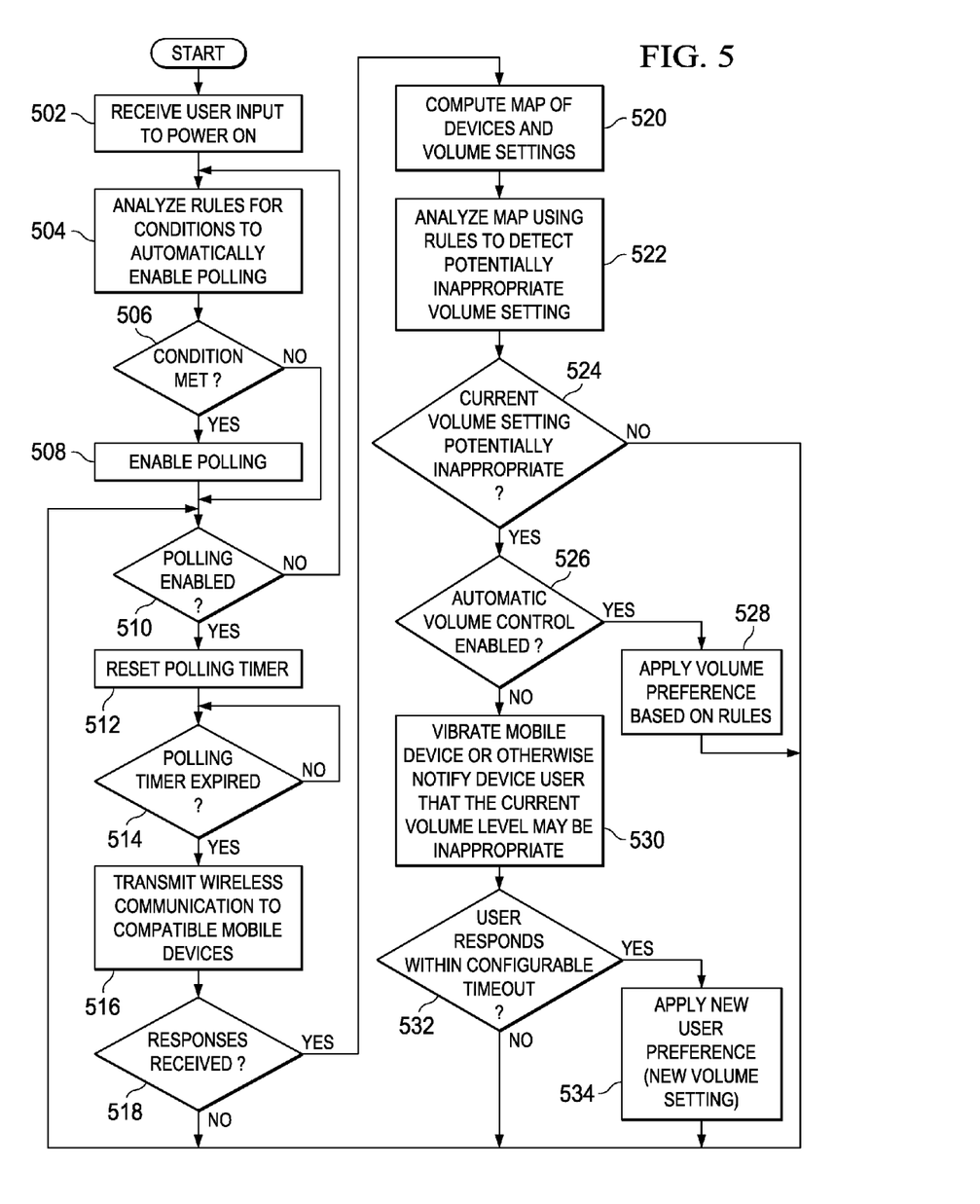
FIG. 5 is a flowchart illustrating an exemplary process for performing local peer volume polling by a mobile device in accordance with an illustrative embodiment.

With reference now to FIG. 5, a flowchart illustrating an exemplary process for performing local peer volume polling by a mobile device is shown in accordance with an illustrative embodiment. The process shown in FIG. 5 may be implemented in a mobile device, such as, for example, mobile device 402 in FIG. 4.

The process begins when the mobile device receives an input to power on from a user, such as, for example, user 404 in FIG. 4 (step 502). Subsequent to powering on in step 502, the mobile device uses a polling unit, such as, for example, polling unit 318 in FIG. 3, to analyze rules for conditions to automatically enable a polling function (step 504). A condition may, for example, be an entry in a calendar, a predetermined time of day, or a specified GPS coordinate that coincides with a location, such as a particular building or room.

After analyzing the rules for conditions to automatically enable the polling function in step 504, the polling device makes a determination as to whether a condition is met (step 506). If a condition is met, yes output of step 506, then the polling unit automatically enables the polling function (step 508). Polling is the operation of requesting audible operation level data from other peer mobile devices within a predetermined distance from the mobile device. The process proceeds to step 510 thereafter.

If a condition is not met, no output of step 506, then the polling unit makes a determination as to whether the polling function is enabled (step 510). If the polling function is not enabled, no output of step 510, then the process returns to step 504. If the polling function is enabled, yes output of step 510, then the polling unit resets a polling timer (step 512). The polling timer is a timer that is set to a predetermined time interval, such as, for example, 10 minutes, to determine when the polling unit performs the polling function.

Subsequent to resetting the polling timer in step 512, the polling unit makes a determination as to whether the polling timer expired (step 514). If the polling timer has not expired, no output of step 514, then the process returns to step 514 where the polling unit waits for the polling timer to expire. If the polling timer has expired, yes output of step 514, then the polling unit transmits a wireless communication to compatible mobile devices within a predetermined distance, such as, for example, 30 feet (step 516). The transmitted communication from the mobile device requests the audible operation data from the other compatible mobile devices within the predetermined distance, such as peer mobile devices 406 and 408 in FIG. 4.

Then, the polling unit makes a determination as to whether any responses to the transmitted communication are received (step 518). If the polling unit does not receive any responses to the transmitted communication, no output of step 518, then the process returns to step 510. If the polling unit does receive one or more responses to the transmitted communication, yes output of step 518, then the polling unit computes a map of the other peer mobile devices within the predetermined distance, along with their respective volume settings (step 520).

After computing the map of the other mobile devices, along with associated volume settings, within the predetermined distance of the mobile device in step 520, the polling unit analyzes the map and volume settings using rules to detect a potentially inappropriate volume setting for the mobile device (step 522). The rules for detecting a potentially inappropriate volume setting may be set by the user, the manufacturer of the mobile device, or the wireless service provider. A rule for detecting a potentially inappropriate volume setting may, for example, be if a majority of the other peer mobile devices within the predetermined distance have a different volume setting from that of the mobile device, then the volume setting may be inappropriate and the user is to be notified of this fact or the volume automatically adjusted to a setting that matches the majority of other peer mobile devices.

Subsequent to analyzing the map and volume settings in step 522, the polling unit makes a determination as to whether the current volume setting of the mobile device is potentially inappropriate (step 524). If the current setting is not potentially inappropriate, no output of step 524, then the process returns to step 510. If the current setting is potentially inappropriate, yes output of step 524, then the polling unit makes a determination as to whether an automatic volume control function is enabled (step 526).

If the automatic volume control function is enabled, yes output of step 526, then the polling unit automatically applies a volume preference, which may be set by, for example, the user, the manufacturer, or the wireless service provider (step 528). Thereafter, the process returns to step 510. If the automatic volume control function in not enabled, no output of step 526, then the polling unit automatically vibrates the mobile device or otherwise notifies the user that the current volume setting of the mobile device may be inappropriate (step 530).

Then, the polling unit makes a determination as to whether the user responds to the notification within a configurable timeout period, such as, for example, within 1 minute (step 532). If the user did not respond within the configurable timeout period, no output of step 532, then the process returns to step 510. If the user did respond within the configurable timeout period, yes output of step 532, then the polling unit applies the new user preference for the volume setting (step 534). In addition to applying the new user preference, the polling unit may also temporarily disable the polling function for a predetermined time interval, such as, for example, 1 hour. Thereafter, the process returns to step 510. It should be noted that this process continues until the mobile device powers off.

Figure 6:
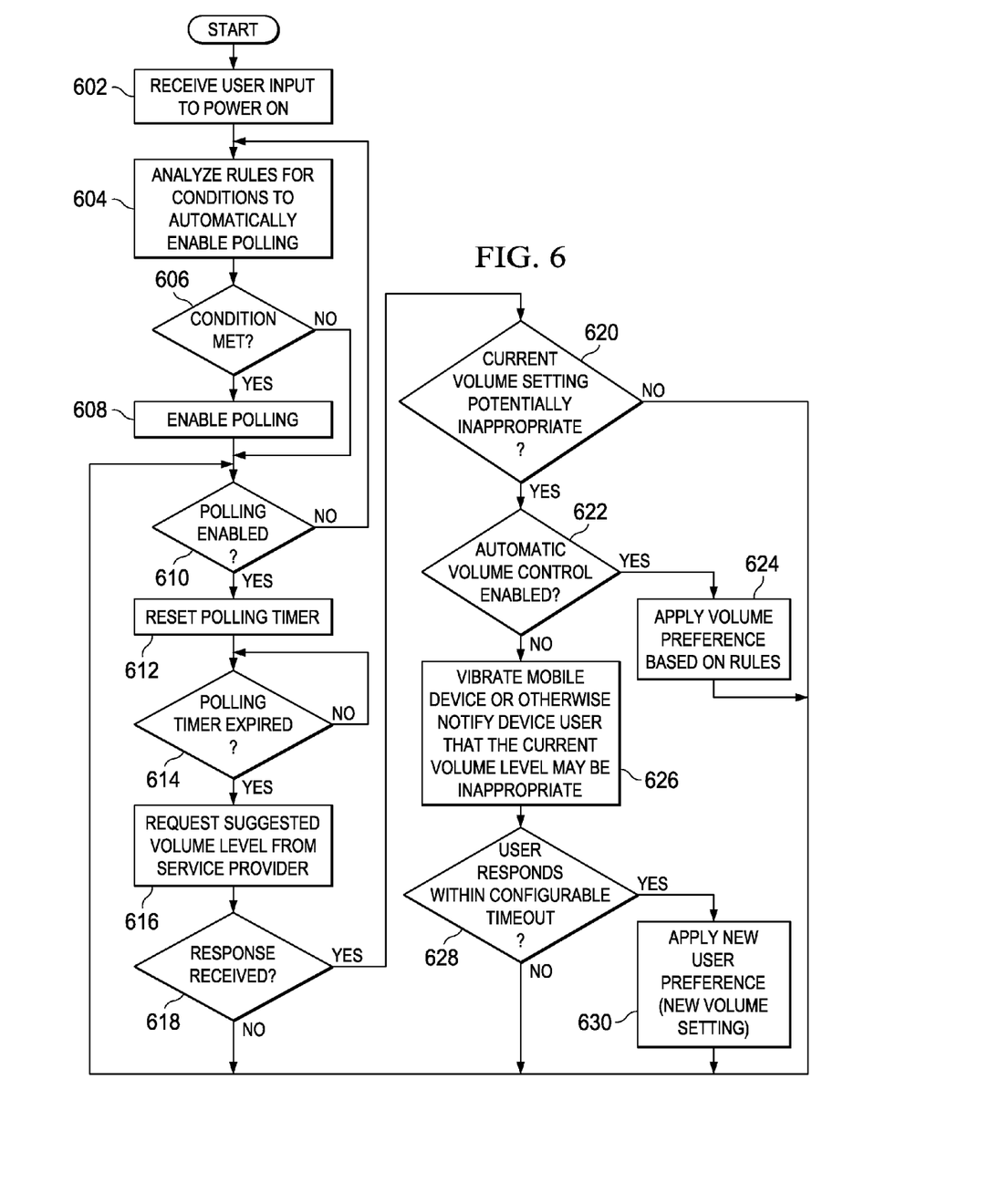
FIG. 6 is a flowchart illustrating an exemplary process for requesting a suggested mobile device volume level from a service provider in accordance with an illustrative embodiment.

With reference now to FIG. 6, a flowchart illustrating an exemplary process for requesting a suggested mobile device volume level from a service provider is shown in accordance with an illustrative embodiment. The process shown in FIG. 6 may be implemented in a mobile device, such as, for example, mobile device 402 in FIG. 4.

The process begins when the mobile device receives an input to power on from a user, such as, for example, user 404 in FIG. 4 (step 602). Subsequent to powering on in step 602, the mobile device uses a polling unit, such as, for example, polling unit 318 in FIG. 3, to analyze rules for conditions to automatically enable a polling function (step 604). After analyzing the rules for conditions to automatically enable the polling function in step 604, the polling device makes a determination as to whether a condition is met (step 606). If a condition is met, yes output of step 606, then the polling unit automatically enables the polling function (step 608). Thereafter, the process proceeds to step 610.

If a condition is not met, no output of step 606, then the polling unit makes a determination as to whether the polling function is enabled (step 610). If the polling function is not enabled, no output of step 610, then the process returns to step 604. If the polling function is enabled, yes output of step 610, then the polling unit resets a polling timer (step 612).

Subsequent to resetting the polling timer in step 612, the polling unit makes a determination as to whether the polling timer expired (step 614). If the polling timer has not expired, no output of step 614, then the process returns to step 614 where the polling unit waits for the polling timer to expire. If the polling timer has expired, yes output of step 614, then the polling unit requests a suggested volume level from the wireless service provider, which collects, calculates, and analyzes location and audible operation level data for compatible mobile devices within a predetermined distance of the mobile device (step 616).

Then, the polling unit makes a determination as to whether a response to the request is received from the wireless service provider (step 618). If the polling unit does not receive a response to the request, no output of step 618, then the process returns to step 610. If the polling unit does receive a response to the request, yes output of step 618, then the polling unit makes a determination as to whether the current volume setting of the mobile device is potentially inappropriate (step 620). If the current setting is not potentially inappropriate, no output of step 620, then the process returns to step 610. If the current setting is potentially inappropriate, yes output of step 620, then the polling unit makes a determination as to whether an automatic volume control function is enabled (step 622).

If the automatic volume control function is enabled, yes output of step 622, then the polling unit automatically applies a volume preference, which may be set by, for example, the user, the manufacturer, or the wireless service provider (step 624). Thereafter, the process returns to step 610. If the automatic volume control function in not enabled, no output of step 622, then the polling unit automatically vibrates the mobile device or otherwise notifies the user that the current volume setting of the mobile device may be inappropriate (step 626).

Then, the polling unit makes a determination as to whether the user responds to the notification within a configurable timeout period (step 628). If the user did not respond within the configurable timeout period, no output of step 628, then the process returns to step 610. If the user did respond within the configurable timeout period, yes output of step 628, then the polling unit applies the new user preference for the volume setting (step 630). In addition to applying the new user preference, the polling unit may also temporarily disable the polling function for a predetermined time interval. Thereafter, the process returns to step 610. It should be noted that this process continues until the mobile device powers off.

Figure 7:
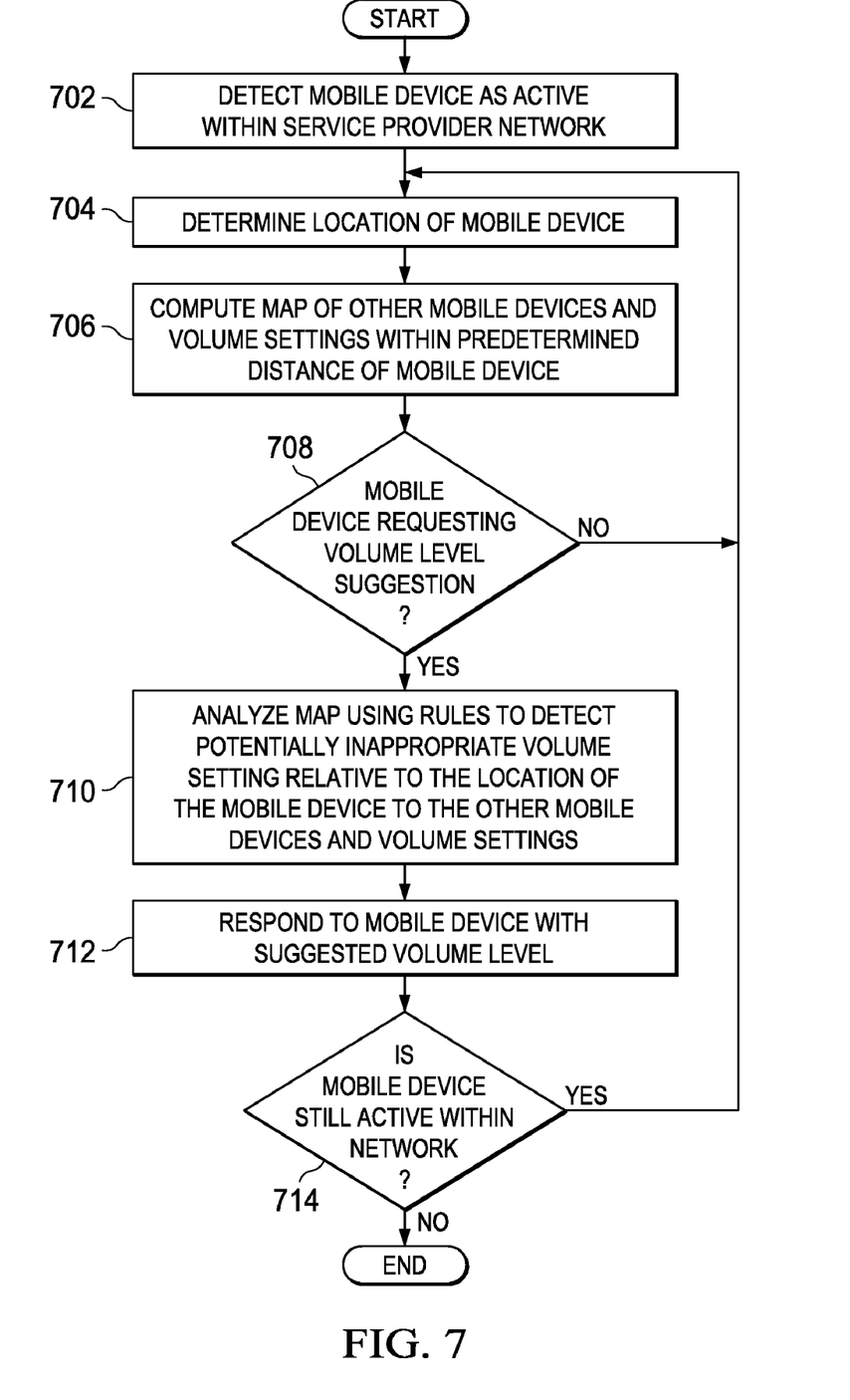
FIG. 7 is a flowchart illustrating an exemplary process for performing remote peer volume polling by a service provider in accordance with an illustrative embodiment.

With reference now to FIG. 7, a flowchart illustrating an exemplary process for performing remote peer volume polling by a service provider is shown in accordance with an illustrative embodiment. The process shown in FIG. 7 may be implemented in a server of a wireless service provider, such as, for example, server 120 in FIG. 1.

The process begins when the server utilizes a polling unit, such as, for example, polling unit 318 in FIG. 3, to detect a mobile device, such as, for example, mobile device 402 in FIG. 4, as active within the service provider network (step 702). The service provider network may, for example, be network data processing system 100 in FIG. 1. After detecting the mobile device as active within the service provider network in step 702, the polling unit determines the location of the mobile device using, for example, cellular telephone tower triangulation and/or GPS data received from the mobile device (step 704). The polling unit may determine the location data on, for example, a predetermined time interval basis. Then, the polling unit computes a generalized map of the other compatible mobile devices, such as peer mobile devices 406 and 408 in FIG. 4, within a predetermined distance of the mobile device, along with their respective volume settings (step 706).

Subsequently, the polling unit makes a determination as to whether the mobile device is requesting a suggested volume level (step 708). If the mobile device is not requesting a suggested volume level from the polling unit, no output of step 708, then the process returns to step 704. If the active mobile device is requesting a suggested volume level, yes output of step 708, then the polling unit analyzes the map using rules to detect a potentially inappropriate volume setting for the mobile device relative to the location of the mobile device to the other compatible mobile devices within the predetermined distance and their respective volume settings (step 710).

After analyzing the map to detect a potentially inappropriate volume setting for the mobile device in step 710, the polling device responds to the mobile device's request with a suggested volume setting (step 712). Then, the polling device makes a determination as to whether the mobile device is still active within the network (step 714). If the mobile device is still active within the network, yes output of step 714, then the process returns to step 704. If the mobile device is not active within the network, no output of step 714, then the process terminates thereafter.

Thus, illustrative embodiments provide an improved computer implemented method, system, and computer usable program code for performing peer volume polling. Specifically, illustrative embodiments allow for the audible output of a mobile device to be automatically adjusted by polling the audible level operations of other mobile devices within the immediate vicinity. Moreover, the polling of other mobile devices within the vicinity enables the mobile device to determine the percentage of different volume levels through short range transmissions and adjust the mobile device accordingly. Furthermore, the mobile devices may be automatically silenced, set to vibration mode, and/or display a message to the user to silence the device.

Various embodiments of the invention may take the form of an entirely hardware embodiment, an entirely software embodiment, or an embodiment containing both hardware and software elements. An exemplary preferred embodiment is implemented in software, which includes but is not limited to firmware, resident software, microcode, etc.

Furthermore, various other embodiments may take the form of a computer program product accessible from a computer-usable or computer-readable medium providing program code for use by or in connection with a computer or any instruction execution system. For the purposes of this description, a computer-usable or computer-readable medium may be any tangible apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the various embodiments has been presented for purposes of illustration and description, and is not intended to be exhaustive or limited to the forms disclosed. Many modifications and variations will be apparent to those of ordinary skill in the art. The embodiments were chosen and described in order to best explain the principles of the invention, the practical application, and to enable others of ordinary skill in the art to understand the embodiments with various modifications as are suited to the particular use contemplated.

What is claimed is:

1. A computer implemented method for performing local peer volume polling by a mobile device, the computer implemented method comprising:
   responsive to determining that a polling function is enabled in a mobile device, wherein the polling function requests audible operation level setting data from peer mobile devices within a predetermined distance of the mobile device, transmitting a request to each of the peer mobile devices using the polling function;
   computing a map of the peer mobile devices along with their associated audible operation level settings based on responses to the request for the audible operation level setting data;
   analyzing the map and audible operation level settings for the peer mobile devices using rules to detect an inappropriate volume setting for the mobile device; and
   responsive to determining that a current audible operation level setting for the mobile device is inappropriate using the rules, applying a new audible operation level setting to the mobile device.

2. The computer implemented method of claim 1, further comprising:
   determining whether a condition is met to automatically enable the polling function in the mobile device; and
   responsive to determining that the condition is met, automatically enabling the polling function.

3. The computer implemented method of claim 1, further comprising:
   determining whether an automatic audible operation level control is enabled; and
   responsive to determining that the automatic audible operation level control is enabled, automatically applying the new audible operation level setting to the mobile device, wherein the new audible operation level setting is a matching audible operation level setting.

4. The computer implemented method of claim 3, further comprising:
   responsive to determining that the automatic audible operation level control is not enabled, vibrating the mobile device; and
   displaying a message in a display to notify a user to change the current audible operation level setting of the mobile device.

5. The computer implemented method of claim 4, further comprising:
   responsive to the user responding to a notification to change the current audible operation level setting within a configurable timeout period, applying the new audible operation level setting based on a preference set by the user.

6. The computer implemented method of claim 5, further comprising:
   responsive to the user not responding to the notification to change the current audible operation level setting within the configurable timeout period, keeping the current audible operation level setting.

7. The computer implemented method of claim 1, further comprising:
   determining whether a polling timer is expired, wherein the polling timer determines when the polling function is performed; and
   responsive to determining that the polling timer is expired, performing the polling function by requesting the audible operation level setting data from each of the peer mobile devices within the predetermined distance of the mobile device.

8. The computer implemented method of claim 2, wherein the condition to automatically enable the polling function is one of a calendar entry, a predetermined time, or a specified location.

9. The computer implemented method of claim 3, wherein the matching audible operation level setting matches an audible operation level setting for a majority of the peer mobile devices within the predetermined distance of the mobile device.

10. The computer implemented method of claim 1, wherein the mobile device and the peer mobile devices within the predetermined distance of the mobile device form an ad hoc wireless network, wherein the ad hoc wireless network enables the mobile device to directly communicate with the peer mobile devices.

11. The computer implemented method of claim 10, wherein the mobile device directly polls the peer mobile devices within the predetermined distance of the mobile device for the audible operation level setting data using the ad hoc wireless network.

12. A data processing system for performing local peer volume polling, comprising:
    a bus system;
    a storage device connected to the bus system, wherein the storage device includes a set of instructions; and
    a processing unit connected to the bus system, wherein the processing unit executes the set of instructions to transmit a request to peer mobile devices within a predetermined distance of a mobile device using a polling function in response to determining that the polling function is enabled in the mobile device, wherein the polling function requests audible operation level setting data from the peer mobile devices; compute a map of the peer mobile devices along with their associated audible operation level settings based on responses to the request for the audible operation level setting data; analyze the map and audible operation level settings for the peer mobile devices using rules to detect an inappropriate volume setting for the mobile device; and
apply a new audible operation level setting to the mobile device in response to determining that a current audible operation level setting for the mobile device is inappropriate using the rules.

13. A computer program product stored on a non-transitory computer readable storage medium having computer usable program code embodied thereon for performing local peer volume polling by a mobile device, the computer program product comprising:
    computer usable program code for transmitting a request to peer mobile devices within a predetermined distance of a mobile device using a polling function in response to determining that the polling function is enabled in the mobile device, wherein the polling function requests audible operation level setting data from the peer mobile devices;
    computer usable program code for computing a map of the peer mobile devices along with their associated audible operation level settings based on responses to the request for the audible operation level setting data;
    computer usable program code for analyzing the map and audible operation level settings for the peer mobile devices using rules to detect an inappropriate volume setting for the mobile device; and
    computer usable program code for applying a new audible operation level setting to the mobile device in response to determining that a current audible operation level setting for the mobile device is inappropriate using the rules.

14. The computer program product of claim 13, further comprising:
    computer usable program code for determining whether a condition is met to automatically enable the polling function in the mobile device; and
    computer usable program code for automatically enabling the polling function in response to determining that the condition is met.

15. The computer program product of claim 13, further comprising:
    computer usable program code for determining whether an automatic audible operation level control is enabled; and
    computer usable program code for automatically applying the new audible operation level setting to the mobile device in response to determining that the automatic audible operation level control is enabled, wherein the new audible operation level setting is a matching audible operation level setting.

16. The computer program product of claim 15, further comprising:
    computer usable program code for vibrating the mobile device in response to determining that the automatic audible operation level control is not enabled; and
    computer usable program code for displaying a message in a display to notify a user to change the current audible operation level setting of the mobile device.

17. The computer program product of claim 16, further comprising:
    computer usable program code for applying the new audible operation level setting based on a preference set by the user in response to the user responding to a notification to change the current audible operation level setting within a configurable timeout period.

18. The computer program product of claim 13, further comprising:
    computer usable program code for determining whether a polling timer is expired, wherein the polling timer determines when the polling function is performed; and
    computer usable program code for performing the polling function by requesting the audible operation level setting data from each of the peer mobile devices within the predetermined distance of the mobile device in response to determining that the polling timer is expired.

19. The computer program product of claim 14, wherein the condition to automatically enable the polling function is one of a calendar entry, a predetermined time, or a specified location.

20. A computer implemented method for performing remote peer volume polling by a server, the computer implemented method comprising:
    responsive to detecting a mobile device as active within a network, determining a location of the mobile device;
    computing a map of other peer mobile devices within a predetermined distance of the mobile device, along with an associated audible operation level setting for each of the other peer mobile devices;
    determining whether the mobile device is requesting a suggested audible operation level setting from a server within the network;
    responsive to determining that the mobile device is requesting the suggested audible operation level setting, analyzing the map of the other peer mobile devices within the predetermined distance of the mobile device, along with the associated audible operation level setting for each of the other peer mobile devices, using rules to detect an inappropriate audible operation level setting for the mobile device; and sending the suggested audible operation level setting to the mobile device from the server based on the rules.

* * * * *